United States Patent
Lee et al.

(10) Patent No.: US 8,916,615 B2
(45) Date of Patent: Dec. 23, 2014

(54) PH-SENSITIVE POLYMER HYDROGEL WITH DUAL IONIC TRANSITION AND USE THEREOF

(71) Applicant: Research & Business Foundation Sungkyunkwan University, Suwon-si (KR)

(72) Inventors: Doo Sung Lee, Gwacheon-si (KR); Bong Sup Kim, Suwon-si (KR); Cong Truc Huynh, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 13/761,419

(22) Filed: Feb. 7, 2013

(65) Prior Publication Data

US 2013/0225696 A1 Aug. 29, 2013

(30) Foreign Application Priority Data

Feb. 7, 2012 (KR) ........................ 10-2012-0012089

(51) Int. Cl.
| | | |
|---|---|---|
| *C08G 71/04* | (2006.01) | |
| *C08G 18/38* | (2006.01) | |
| *C08G 18/42* | (2006.01) | |
| *C08G 18/73* | (2006.01) | |

(52) U.S. Cl.
CPC ............ *C08G 71/04* (2013.01); *C08G 18/3831* (2013.01); *C08G 18/4269* (2013.01); *C08G 18/73* (2013.01); *C08G 2130/00* (2013.01)
USPC ....................................... 514/772.1; 525/418

(58) Field of Classification Search
CPC ........... C08G 18/3831; C08G 18/4269; C08G 18/73; C08G 71/04; C08G 75/30; C08J 300/16
See application file for complete search history.

(56) References Cited

U.S. PATENT DOCUMENTS

| | | |
|---|---|---|
| 4,942,035 A | 7/1990 | Churchill et al. |
| 5,476,909 A | 12/1995 | Kim et al. |

FOREIGN PATENT DOCUMENTS

KR 2000-0012970 3/2000

OTHER PUBLICATIONS

Huynh et al., Chem. Commun., 2012, 48, 10951-10953.*
Cong Truc Huynh "Study on Poly(amino urethane)-based pH/temperature-Sensitive Hydrogels and Their Application for Drug/Protein Delivery", Doctorial Dissertation, Sungkyunkwan University, (Jun. 2011).

* cited by examiner

*Primary Examiner* — Kyle Purdy
(74) *Attorney, Agent, or Firm* — NSIP Law

(57) ABSTRACT

Disclosed is a dual-transition polymeric hydrogel. Also, provided is the use of the dual-transition polymeric hydrogel as a carrier for drug delivery and disease diagnosis, or in the preparation of a polymeric hydrogel-type pharmaceutical composition comprising the physiologically active agent loadable into the block copolymer. Being sensitive to pH as well as temperature, the block copolymer can form a more stable hydrogel at suitable temperatures and pH values. In addition, the block copolymer exhibits a dual transition behavior with pH values so that it can carry ionic drugs, proteins, DNA, and markers, whether positively or negatively charged, simultaneously. Therefore, it can be applied to a sustained drug delivery system for sparingly soluble, hydrophobic drugs, and hydrophilic drugs. Further, it is safe to and stable within the body, and is expected to find various applications in the medical field.

23 Claims, 9 Drawing Sheets

PH-SENSITIVE POLYMER HYDROGEL WITH DUAL IONIC TRANSITION AND USE THEREOF

STATEMENT REGARDING GOVERNMENT RIGHTS

This invention was made with government support of Republic of Korea under Contract Nos. 2010-0027955 (80%) and 2011K000817 (20%) awarded by Korean Ministry of Science, ICT and Future Planning. The government has certain rights in the invention.

CROSS-REFERENCE TO RELATED APPLICATION(S)

This application claims the benefit under 35 U.S.C. §119 (a) of Korean Patent Application No. 10-2012-0012089 filed on Feb. 7, 2012, in the Korean Intellectual Property Office, the entire disclosure of which is incorporated herein by reference for all purposes.

BACKGROUND

1. Field

The following description relates to a pH-sensitive polymer hydrogel with dual ionic transition and the use thereof.

2. Description of Related Art

In the medical field of drug delivery systems, intensive research has recently been focused on sustained drug delivery of physiologically active agent using the sol-gel transition of a hydrogel made of an amphoteric polymer with both hydrophobic and hydrophilic groups.

U.S. Pat. No. 4,942,035 discloses a copolymer consisting of a hydrophilic polymer, e.g., polyethylene glycol, and a biodegradable polyester, e.g., polylactide, polyglycolide, or polycaprolactone, which surmounts the problem that the block copolymer composed of polyethylene glycol and a polyethyleneoxide-polypropyleneoxide-polyethyleneoxide block copolymer, called Pluronic, is not biodegradable.

U.S. Pat. No. 5,476,909 describes a biodegradable triblock copolymer of an A-B-A type which essentially consists of polylactic acid (PLA), polyglycolic acid (PGA), or PLA/PGA as the hydrophobic block (A), and polyethylene glycol (PEG) or derivatives thereof as the hydrophilic block (B).

Korean Patent Laid-Open Publication No. 2000-0012970 teaches a pH-sensitive polymer comprising a sulfonamide group, and a preparation method thereof, focusing on the solubility of linear polymers prepared by random copolymerization of sulfonamide monomers, and dimethyl acrylamide or isopropyl acrylamide, and on the degree of swelling of the crosslinked polymers.

These conventional techniques concern block copolymers consisting of biodegradable hydrophobic polymers and hydrophilic polymers which exhibit sol-gel transition according to temperature so that after being introduced in a liquid form of sol into the body, the block copolymers experiences phase transition into a gel due to the body temperature, thus acting as a sustained drug delivery system which is stably impregnated with a drug and releases the drug in a sustained manner. However, block copolymers that exhibit sol-gel transition according to temperature suffer from the drawback of clogging the syringe needle before completion of the introduction because they gel in the course of injection as the syringe needle reaches thermal equilibrium with the body temperature. Although reported to be pH-sensitive, the hydrophobic moiety consisting of polylactic acid (PLA), polylactic acid-co-polyglycolic acid (PLGA), polycaprolactone (PCL), or polycaprolactone-co-polylactic acid (PCLA) is not sufficiently sensitive to pH in vivo so that it cannot be applied to drug delivery in practice.

SUMMARY

Accordingly, the present invention has been made keeping in mind the above problems occurring in the prior art, and an object of the present invention is to provide a dual-transition polymeric hydrogel.

Another object of the present invention is to provide the use of the dual-transition polymeric hydrogel as a carrier for drug delivery and disease diagnosis, or in the preparation of a polymeric hydrogel-type pharmaceutical composition.

In accordance with an aspect thereof, the present invention provides a block copolymer comprising a copolymer consisting of a hydrophilic polyethylene glycol (PEG)-based compound and a hydrophobic, biodegradable polymer; and an oligomer consisting of poly(β-aminoester urethane)-g-sulfonamide.

In one embodiment, the block compound is sensitive to both temperature and pH.

In another embodiment, the block compound exhibits a cationic/anionic dual transition behavior with pH change.

According to a further embodiment, the polyethylene glycol-based compound is represented by the following Chemical Formula 1:

[Chemical Formula 1]

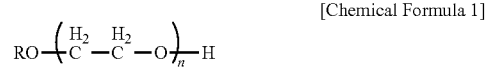

wherein R is hydrogen or an alkyl group containing 1 to 5 carbon atoms, and n is an integer of 11 to 45.

In still another embodiment, the polyethylene glycol-based compound ranges in number average molecular weight (Mn) from 500 to 5,000 g/mol.

In a still further embodiment, the biodegradable polymer is selected from the group consisting of polylactic acid (PLA), polyglycolic acid (PGA), polycaprolactone (PCL), a poly (caprolactone-lactic acid) random copolymer (poly(capro-lactone-r-lactic acid), PCLA), a poly(caprolactone-glycolic acid) random copolymer (poly(caprolactone-r-glycolic acid), PCGA), and a poly(lactic acid-glycolic acid) random copolymer (poly(lactic acid-r-glycolic acid), PLGA).

In yet another embodiment, the polyethylene glycol-based compound and the biodegradable polymer have a molar ratio ranging from 1:1 to 1:3.

In a yet still another embodiment, the copolymer of hydrophilic PEG-based compound and biodegradable hydrophobic polymer has an amine group that is reactable with an oligomer consisting of poly(β-aminoester urethane)-g-sulfonamide).

In an additional embodiment, the oligomer consisting of poly(β-aminoester urethane)-g-sulfonamide has a tertiary amine that is ionized at relatively acidic pH (e.g., pH 6.5).

In another additional embodiment, the oligomer consisting of poly(β-aminoester urethane)-g-sulfonamide has a sulfonamide group that is ionized at relatively basic pH (e.g., pH 8.5).

In a further additional embodiment, the oligomer consisting of poly(β-aminoester urethane)-g-sulfonamide is prepared by reacting: a compound having a hydroxyl group; an amine compound; and an isocyanate compound; and a sulfonamide compound.

The compound having a hydroxyl group is a hydrophilic polymer polyethylene glycol (PEG) compound. The degradable polymer is selected from the group consisting of polylactic acid (PLA), polyglycolic acid (PGA), polycaprolactone (PCL), poly(caprolactone-lactic acid) random copolymer (poly(caprolactone-r-lactic acid), PCLA), poly(caprolactone-glycolic acid) random copolymer (poly(caprolactone-r-glycolic acid), PCGA), and poly(lactic acid-glycolic acid) random copolymer (poly(lactic acid-r-glycolic acid), PLGA). The amine compound is a primary or secondary amine compound. In this regard, the secondary amine compound is selected from the group consisting of diethanolamine, dipropanolamine, dibutanolamine, dipentanolamine, diheptanolamine, and dioctanolamine, and the isocyanate compound has an isocyanate group at each end. The isocyanate compound is tetramethylene diisocyanate (TDI) or hexamethylene diisocyanate (HDI), but not limited to. The sulfonamide compound is selected from the group consisting of sulfadiazine ($pK_a$=6.5). sulfamethazine ($pK_a$=7.5) and sulfapyridine ($pK_a$=8.4).

The compound having a hydroxyl group, the amine compound, and the isocyanate compound has a molar ratio of from 1:0.5:3 to 1:2.0:6.0.

In still another additional embodiment, the oligomer consisting of poly(β-aminoester urethane)-g-sulfonamide ranges in molecular weight from 4,000 to 10,000 g/mol.

In a still further additional embodiment, the block copolymer is in a penta- or multi-block form.

In yet another additional embodiment, the block copolymer is represented by the following General Formula:

In accordance with a further aspect thereof, the present invention provides a polymeric hydrogel-type pharmaceutical composition, comprising: the block copolymer; and a physiologically active agent loadable into the block copolymer.

In accordance with still another aspect thereof, the present invention provides the use of a copolymer as a carrier for drug delivery or disease diagnosis, said copolymer comprising: one or more of hydrophilic block; a biodegradable block that varies in hydrophobicity with temperature; and a unit that varies in degree of ionization with pH.

In one embodiment, the unit that varies in degree of ionization with pH is an oligomer consisting of poly(β-aminoester urethane)-g-sulfonamide).

Being sensitive to pH as well as temperature, the block copolymer of the present invention overcomes the problems with conventional pH-sensitive block copolymers, and can form a more stable hydrogel at suitable temperatures and pH values. In addition, the block copolymer exhibits a dual transition behavior with pH values so that it can carry ionic drugs, proteins, DNA, and markers, whether positively or negatively charged, simultaneously. Therefore, it can be applied to a sustained drug delivery system for sparingly soluble hydrophobic drugs and hydrophilic drugs. Further, it is safe to and stable within the body, and is expected to find various applications in the medical field.

BRIEF DESCRIPTION OF THE DRAWINGS

The above and other objects, features and other advantages of the present invention will be more clearly understood from

[General Formula]

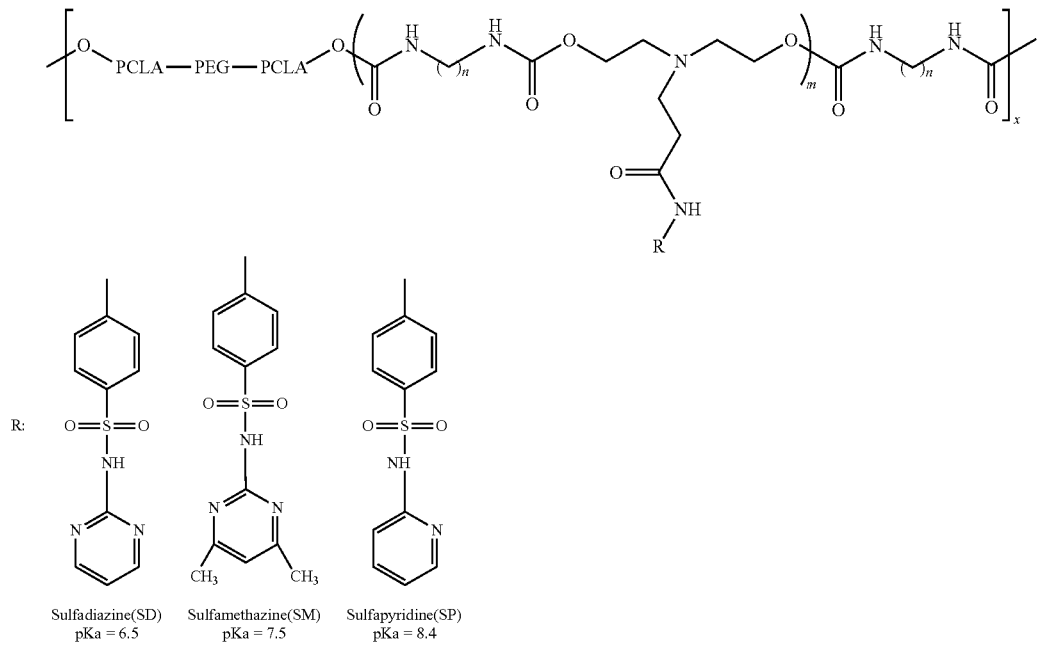

wherein
x is an integer of 1 to 200;
m is an integer of 1 to 50; and
n is an integer of 4 to 6.

Figure 1:
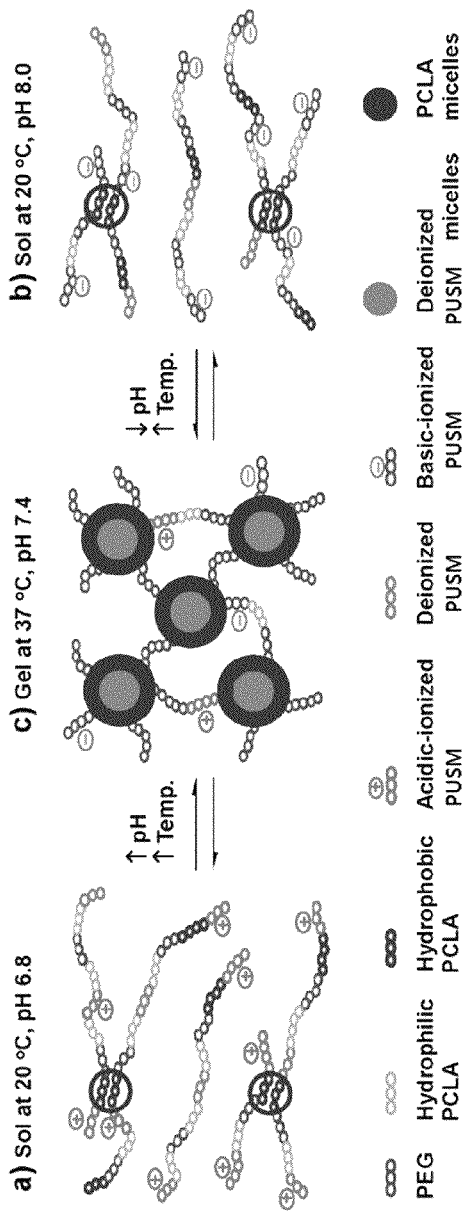

In accordance with another aspect thereof, the present invention provides a carrier for sustained drug delivery or disease diagnosis, comprising the block copolymer.

the following detailed description taken in conjunction with the accompanying drawings, in which:

FIG. 1 is schematic concept of loop-type dual transition showing reversible sol-gel-sol phase transition of PUSM hydrogels with changing temperature and pH. Ionization of basic portions containing amine groups in the PUSM at slightly acidic pH (a) and of acidic portions composed of sulfonamide groups in the PUSM at slightly basic pH (b) renders the polymer hydrophilic, resulting in a sol state in water. In contrast, relative deionization of both basic and acidic portions of the PUSM and increases in hydrophobicity of the PCLA under physiological conditions led to formation and interconnection of nanostructured polymeric micelles, resulting in gelation (c). The positive and negative charges in (c) indicate that the PUSM is not fully deionized.

Figure 2:
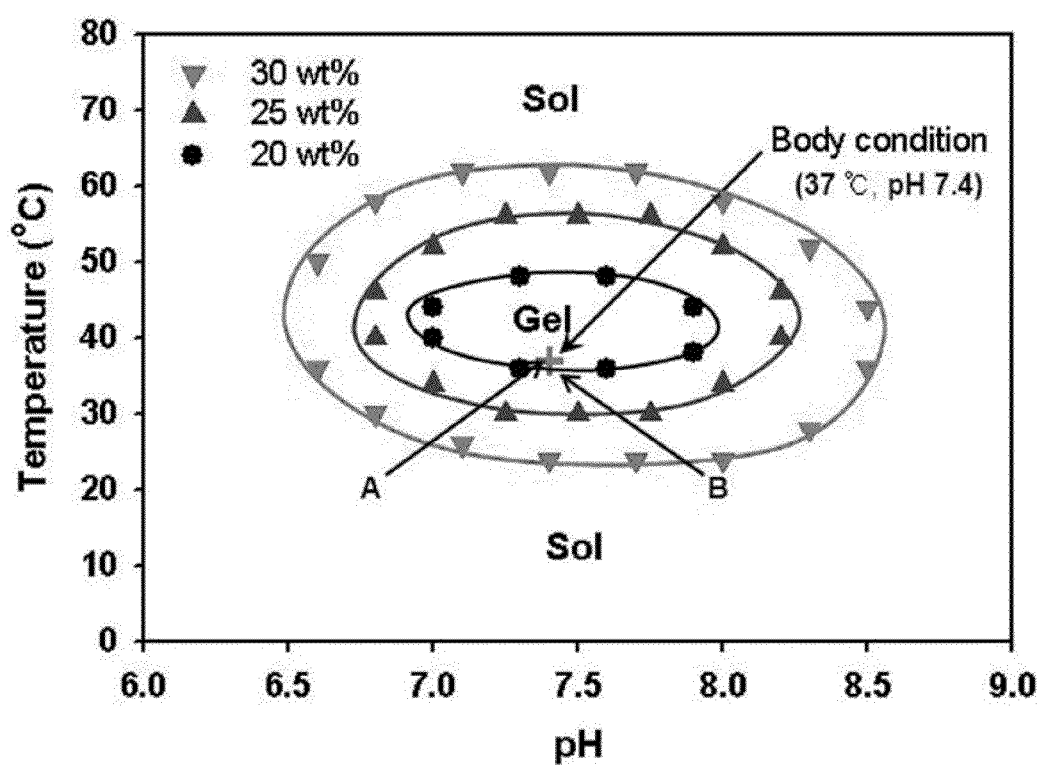

FIG. 2 are sol-gel-sol transition diagram of 20, 25, and 30 wt % solutions of poly(ε-caprolactone-co-lactic acid)-polyethylene glycol-poly(ε-caprolactone-co-lactic acid)-poly(β-aminoester urethane)-g-sulfonamide oligomer (PCLA-PEG-PCLA-PUSM) multi-block copolymer in PBS, the block copolymer being prepared in Example 3 and comprising a temperature-sensitive and hydrophilic polyethylene glycol-based compound, a biodegradable, hydrophobic polymer [poly(ε-caprolactone)-co-polylactic acid], and a dual transition, pH-sensitive sulfamethazine-g-β-aminoester urethane oligomer compound.

Figure 3:
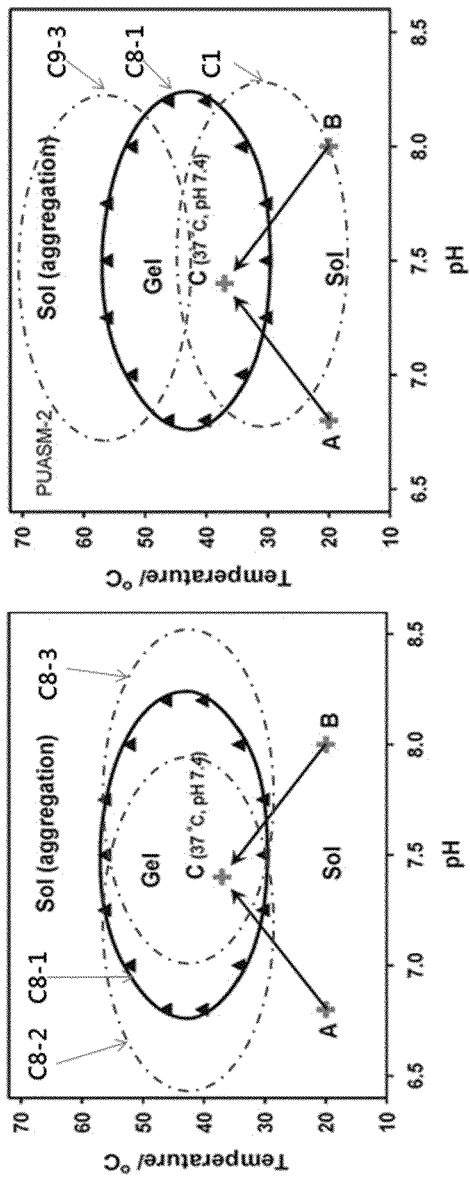

FIG. 3 show closed-loop sol-gel phase diagram of C8-1, C8-2, C8-3, C1 and C9-3 copolymers (25 wt %). The bioactive molecules and copolymer solution can be formulated and injected into the body at either slightly acidic pH (e.g., A, pH 6.8) or slightly basic pH (e.g., B, pH 8.0), and a gel forms rapidly under physiological conditions (C, 37° C., pH 7.4).

Figure 4:
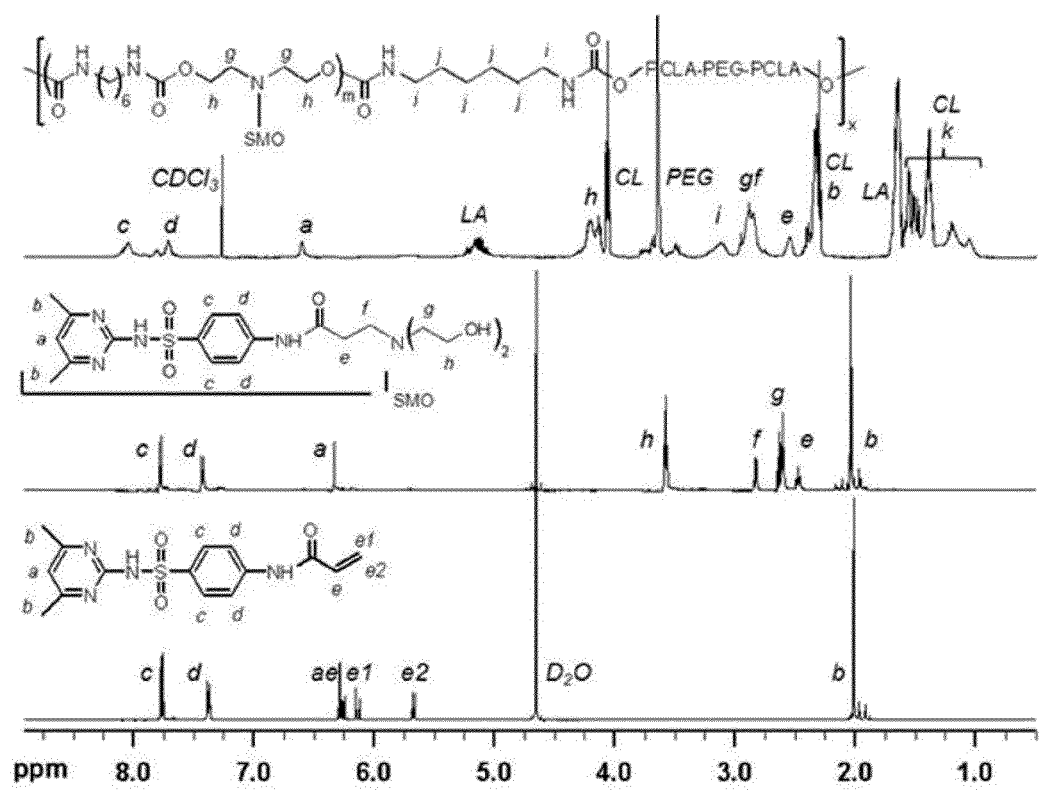

FIG. 4 show $^1$H-NMR spectra of poly(ε-caprolactone-co-lactic acid)-polyethylene glycol-poly(ε-caprolactone-co-lactic acid)-poly(β-aminoester urethane)-g-sulfonamide oligomer (PCLA-PEG-PCLA-PUSM) multiblock copolymers, prepared in Example 3, comprising a temperature-sensitive and hydrophilic polyethylene glycol-based compound, a biodegradable, hydrophobic polymer [poly(ε-caprolactone)-co-polylactic acid], and a dual transition, pH-sensitive sulfamethazine-g-β-aminoester urethane oligomer compound.

Figure 5:
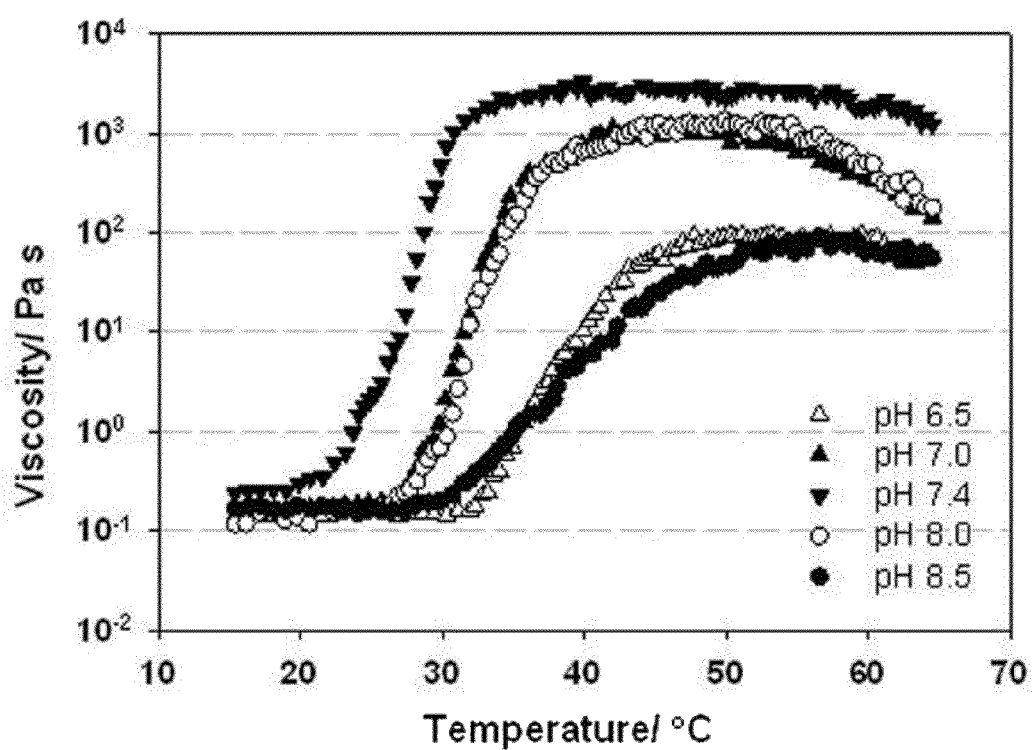

FIG. 5 is a graph in which the viscosity of a 25 wt % solution of poly(ε-caprolactone-co-lactic acid)-polyethylene glycol-poly(ε-caprolactone-co-lactic acid)-poly(β-aminoester urethane)-g-sulfonamide oligomer (PCLA-PEG-PCLA-PUSM) multi-block copolymer is measured as a function of temperature at 5 pH values using parallel plates apart 1 mm from each other, in an oscillation mode, with the temperature elevated at a rate of 1° C./min, the block copolymer being prepared in Example 3 and comprising a temperature-sensitive and hydrophilic polyethylene glycol-based compound, a biodegradable, hydrophobic polymer [poly(ε-caprolactone-co-polylactic acid], and a dual transition, pH-sensitive sulfamethazine-g-β-aminoester urethane oligomer compound.

Figure 6:
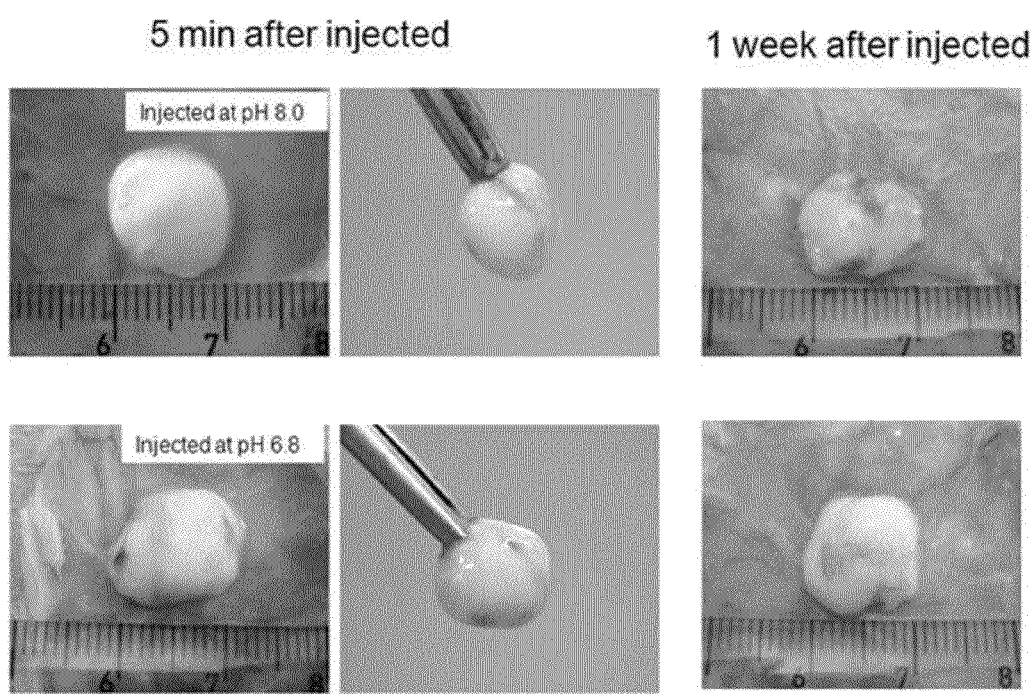

FIG. 6 show photographs illustrating the in vivo gel formation of the poly(ε-caprolactone-co-lactic acid)-polyethylene glycol-poly(ε-caprolactone-co-lactic acid)-poly(β-aminoester urethane)-g-sulfonamide oligomer (PCLA-PEG-PCLA-PUSM) multiblock copolymer prepared in Example 3 with time after injection of 25 wt % solutions of the copolymer at pH 6.8 and pH 8.0 into mice, the block copolymer being comprising a temperature-sensitive and hydrophilic polyethylene glycol-based compound, a biodegradable, hydrophobic polymer [poly(ε-caprolactone)-co-polylactic acid], and a dual transition, pH-sensitive sulfamethazine-g-β-aminoester urethane oligomer compound.

Figure 7:
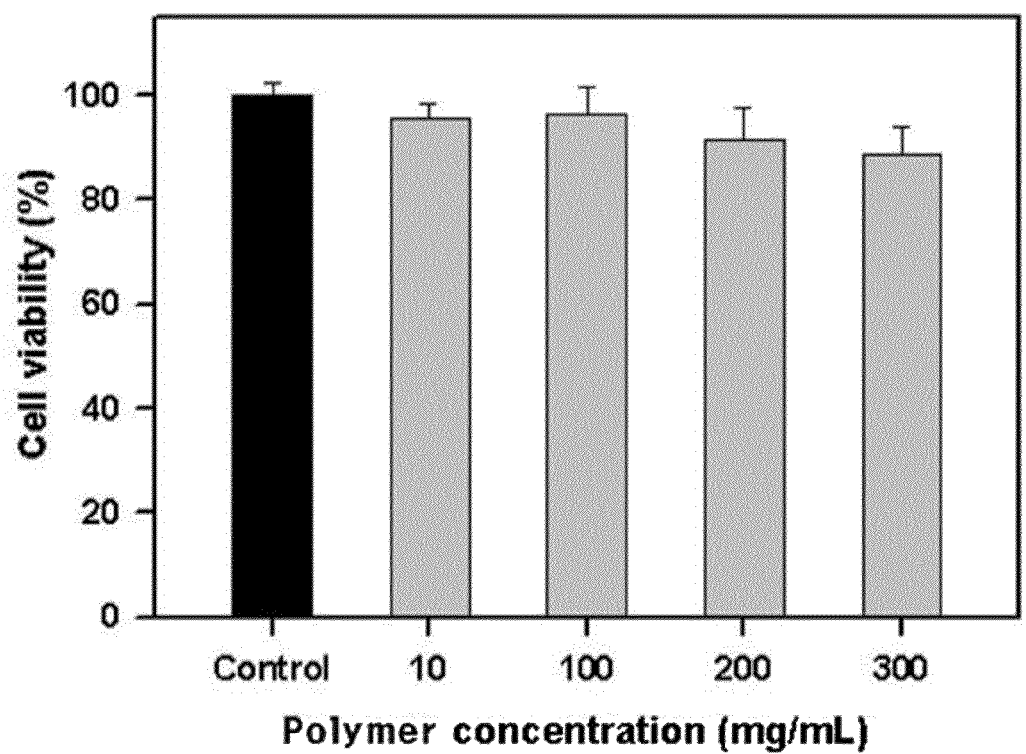

FIG. 7 is a graph showing the biocompatibility of the poly(ε-caprolactone-co-lactic acid)-polyethylene glycol-poly(ε-caprolactone-co-lactic acid)-poly(β-aminoester urethane)-g-sulfonamide oligomer (CLA-PEG-PCLA-PUSM) multi-block copolymer prepared in Example 3 in which cell viability is measured as the function of concentrations of the copolymer after the exposure of cells to the copolymer for 2 days according to the extraction method (L929), the block copolymer comprising a temperature-sensitive and hydrophilic polyethylene glycol-based compound, a biodegradable, hydrophobic polymer [poly(ε-caprolactone)-co-polylactic acid], and a dual transition, pH-sensitive sulfamethazine-g-β-aminoester urethane oligomer compound.

Figure 8:
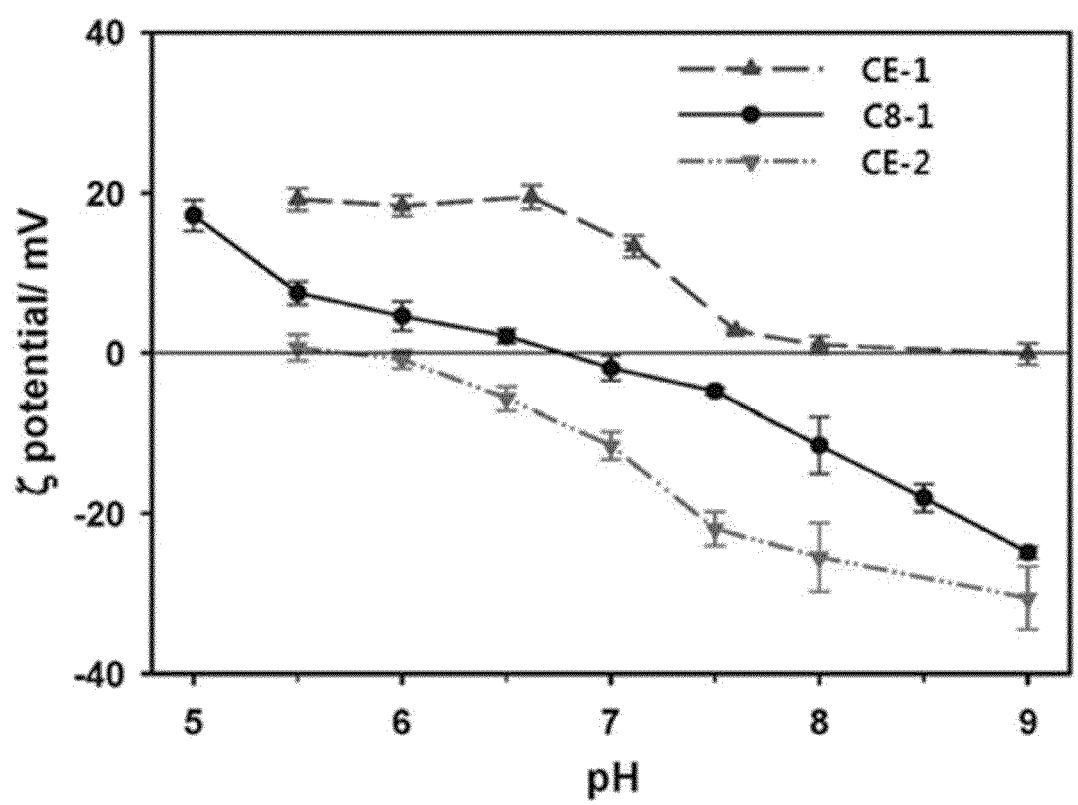

FIG. 8 show Zeta potential of C8-1 (dual), CE-1 (cationic) and CE-2 (anionic) copolymers in water (2 mg/mL) at different pH.

Figure 9:
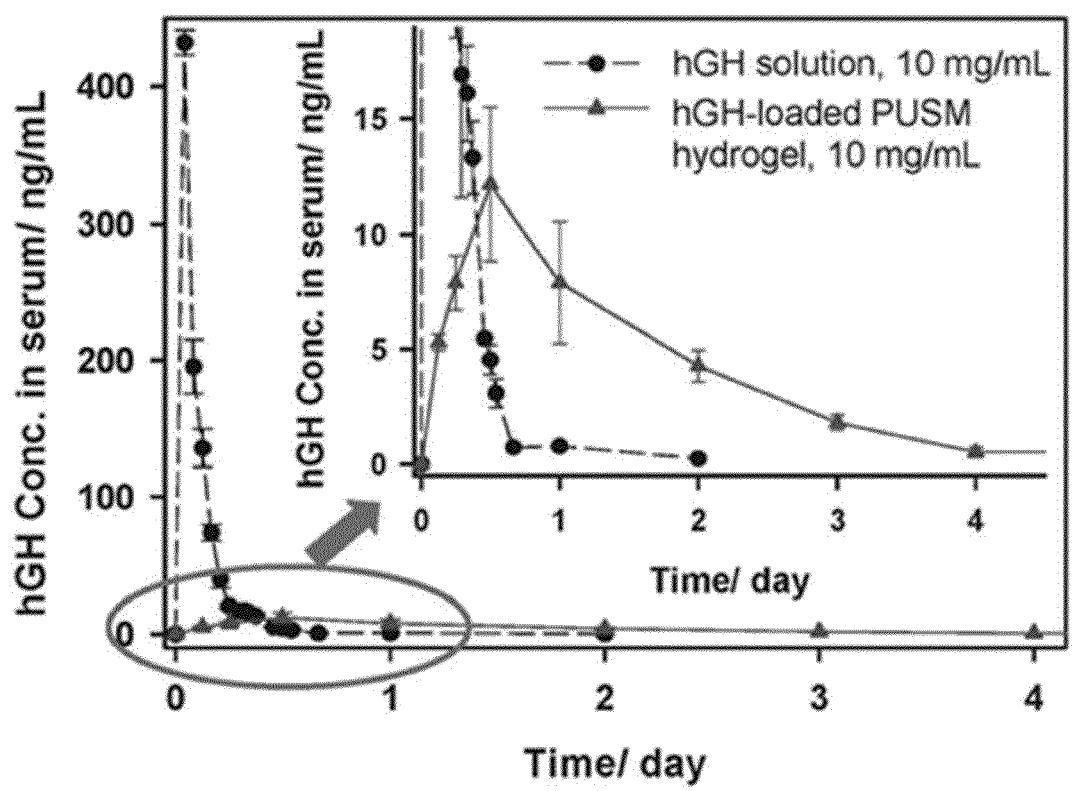

FIG. 9 shows the release concentration of hGH in the plasma of SD rats after injecting 200 μl of the hGH solutions (10 mg/mL) and 200 μl of the hGH-loaded C8-1 (25 wt %) solutions (hGH 10 mg/mL) (SD, n=5).

DETAILED DESCRIPTION

In consideration of the problem that when a temperature-sensitive hydrogel prepared from a block copolymer consisting of a hydrophilic polyethylene glycol (PEG)-based compound and a hydrophobic biodegradable polyester such as PCLA is injected alone into the body using a syringe, it is apt to clog the syringe needle before completion of the injection because of its gelation due to the transfer of body heat to the needle, the present inventors conceived a negatively charged, multi-block copolymer, sensitive to both temperature and pH, prepared from the hydrophilic polymer polyethylene glycol and the hydrophobic, biodegradable polymer PCLA plus a pH-sensitive polymeric sulfonamide compound, and a positively charged, multi-block copolymer prepared from the hydrophilic polymer polyethylene glycol and the hydrophobic, biodegradable polymer PCLA plus a poly(β-aminoester urethane)-g-sulfonamide-based compound, and produced hydrogels from the multi-block copolymers. The hydrogels do not clog the syringe needles through which they are injected into the body, unlike conventional temperature-sensitive polymeric hydrogels, and can carry ionic drugs because the negatively and positive charged block copolymers form ionic complexes with cationic drugs such as EGF and VEGF, and with anionic drugs such as insulin, hGH and EPO, respectively. Therefore, the anionic and cationic hydrogels are now applied to sustained delivery systems of ionic proteins and drugs.

In the study of a carrier capable of carrying both anionic and cationic drugs, the present inventors conceived a dual transition, multi-block copolymer hydrogel molecularly designed to have the positively charged, pH-sensitive polymer as a backbone, with the negatively charged, pH-sensitive polymer grafted thereto, culminating in the present invention.

In practice, the dual transition, multi-block copolymer hydrogel of the present invention exhibits a sensitive sol-gel transition behavior in response to pH as well as temperature. For example, the hydrogel becomes a gel at a pH of 7~7.4, and undergoes solation at a pH exceeding the range. Thus, the hydrogel of the present invention can be introduced into the body without causing the clogging of the syringe needle, and is safely converted into a gel within the body. The dual transition multi-block copolymer hydrogel can form ionic complexes with cationic and anionic drugs, thus preventing the initial burst release of drugs in the early stage of delivery. In addition, the dual transition, multi-block copolymer can be available as a sustained drug delivery system because it was found to stably retain and release a drug in a sustained manner at a specific temperature and a specific pH within the body.

In this context, the present invention contemplates a dual transition, multi-block copolymer sensitive to both temperature and pH, a method for preparing the same, and a polymeric hydrogel composition comprising the same.

Below, a detailed description will be given of the present invention.

In accordance with an aspect thereof, the present invention addresses a block copolymer comprising: a copolymer consisting of a hydrophilic polyethylene glycol (PEG)-based compound and a hydrophobic, biodegradable polymer; and an oligomer consisting of poly(β-aminoester urethane)-g-sulfonamide.

Being sensitive to both body temperature and body pH, the block copolymer shows dual transition properties. The dual transition block copolymer may be prepared by reacting a temperature-sensitive copolymer consisting of a hydrophilic polyethylene glycol (PEG)-based compound and a hydrophobic, biodegradable polymer, such as polylactic acid (PLA), polylactic acid-co-polyglycolic acid (PLGA), poly ε-caprolactone (PCL), or poly ε-caprolactone-co-polylactic acid (PCLA), with a poly(β-aminoester urethane)-based compound and a sulfonamide oligomer, both being pH-sensitive molecules which are ionized depending on pH to take positive and negative charges at a certain pH, respectively.

Also contemplated in accordance with another aspect of the present invention is a polymeric hydrogel comprising the dual transition block copolymer.

The present invention has the following advantages over the conventional techniques.

1) Conventional block copolymers composed of a hydrophilic polymer such as polyethylene glycol (PEG), and a biodegradable, hydrophobic polymer, such as polylactic acid (PLA), polylactic acid-co-polyglycolic acid (PLGA), poly ε-caprolactone (PCL), or poly ε-caprolactone-co-polylactic acid (PCLA) exhibit sol-gel transition behaviors according to the change of physical properties of the hydrophilic and hydrophobic blocks with temperature, but are difficult to apply to drug delivery systems because of their insufficient sensitivity to temperature and in vivo side effects attributable to the thermal equilibrium of a delivery medium.

In the present invention, a temperature-sensitive block copolymer composed of a hydrophilic polymer and a biodegradable, hydrophobic polymer is grafted with a poly(β-aminoester urethane)-based compound and a sulfonamide-based compound both of which show pH-dependent degrees of ionization to afford a block copolymer sensitive to both temperature and pH. This pH- and temperature-sensitive block copolymer is prepared into a dual transition hydrogel which can overcome the problem with the conventional temperature-sensitive hydrogels, and can deliver cationic and anionic compounds simultaneously.

Particularly, the hydrogel made of the temperature- and pH-sensitive copolymer of the present invention exhibits a reversible sol-to-gel transition behavior in which it is in a physically and chemically stable hydrogel form at a specific pH range and is converted into a sol phase in other pH conditions. In detail, because the tertiary amine within poly(β-aminoester urethane) (PAEU) increases in the degree of ionization at relatively acidic pH (e.g., pH 6.5), PAEU becomes entirely water-soluble so that the block compound cannot form a hydrogel. At a pH of 7.0 or higher, PAEU is less apt to be ionized and is hydrophobic, so that the block compound can form a hydrogel. On the other hand, because the sulfone group present in the sulfonamide oligomer (SMO) increases in the degree of ionization at relatively basic pH (e.g., pH 8.5), SMO becomes entirely water-soluble so that the block copolymer cannot form a hydrogel. In contrast, SMO becomes hydrophobic at a pH less than 8.3 because of a reduction in the degree of ionization thereof, so that the block copolymer can form a hydrogel.

2) In addition, the temperature- and pH-sensitive copolymer of the present invention is safe for the body and thus finds applications in the medical field including gene and drug delivery, particularly as a sustained drug delivery system for the retention and release of drugs, and as an injectable scaffold such as a cell delivery scaffold.

3) Further, various reversible sol-gel dual transition behavior patterns may be designed for the block copolymer of the present invention by adjusting the constituent factors and physical properties thereof, e.g., components, molar ratios, and molecular weights thereof, and/or functional groups within the blocks, and are expected to allow for the application of the block copolymer to the cell or gene therapy of cancer or other fields.

One component of the temperature- and pH-sensitive copolymer is a copolymer (A) of a hydrophilic polymer, such as a PEG-based compound, and a biodegradable, hydrophobic polymer, such as polylactic acid (PLA), polylactic acid-co-polyglycolic acid (PLGA), poly ε-caprolactone (PCL), or poly ε-caprolactone-co-polylactic acid (PCLA). The copolymer (A) exhibits temperature-dependent sol-gel transition due to the co-existence of the hydrophilicity of a PEG-based compound and the hydrophobicity of polylactic acid (PLA), polylactic acid-co-polyglycolic acid (PLGA), poly ε-caprolactone (PCL), or poly ε-caprolactone-co-polylactic acid (PCLA) within a molecule.

So long as it is typical in the art, any PEG-based compound can be employed as the hydrophilic polymer for the copolymer (A) without limitations. Preferable is the PEG-based compound represented by the following Chemical Formula 1:

[Chemical Formula 1]

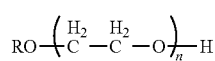

wherein R is a hydrogen atom or an alkyl group containing 1 to 5 carbon atoms, and n is an integer of 11 to 45.

No particular limitations are imparted to the number average molecular weight (Mn) of the polyethylene glycol-based compound. Preferably, the polyethylene glycol-based compound ranges in Mn from 500 to 5,000 g/mol. Particularly, when R in Chemical Formula 1 is hydrogen, the PEG preferably has a Mn of from 1000 to 2000. For example, when the polyethylene glycol-based compound has a number average molecular weight outside the range, that is, less than 500 or greater than 5,000, the block copolymer does not form a gel well, and even if formed, the gel has too low a strength to use as a scaffold for drug delivery in practice.

The biodegradable, hydrophobic polymer used in the temperature-sensitive copolymer (A) may be a biodegradable aliphatic polyester typically known in the art. A polymer or copolymer of ε-caprolactone (CL), glycolide (GA), and/or lactide (LA) is preferable. Examples of the biodegradable, hydrophobic polymer include, but are not limited to, polylactic acid (PLA), polyglycolic acid (PGA), poly ε-caprolactone (PCL), a poly(ε-caprolactone-lactic acid) random copolymer (poly(ε-caprolactone-r-lactic acid), PCLA), a poly(ε-caprolactone-glycolic acid) random copolymer (poly(ε-caprolactone-r-glycolic acid), PCGA), and a poly(lactic acid-glycolic acid) random copolymer (poly(lactic acid-r-glycolic acid), PLGA). In addition to the biodegradable polymers, other biodegradable polymers that can form a copolymer with a hydrophilic PEG-based compound fall within the scope of the present invention.

ε-caprolactone (CL) and lactide (LA), which are starting materials of PCL and PLA, respectively, are reacted together with polyethylene glycol in the presence of a tin catalyst to produce the triblock copolymer poly(ε-caprolactone-lactic acid) random copolymer-polyethylene glycol-poly(ε-caprolactone-lactic acid) random copolymer (PCLA-PEG-PCLA), as illustrated in Chemical Formula 2. In addition to CL and LA, GA may be used as a starting material of the biodegradable polymer:

molar ratio of the hydrophilic polymer to the biodegradable, hydrophobic polymer is preferably on the order of 1:1~3. For example, the molar ratio of less than 1:1 does not allow gelation to take place. On the other hand, when the molar ratio exceeds 1:3, the block copolymer may be insoluble in water because of increased hydrophobicity.

In the degradable hydrophobic polymer, such as PCLA, PCGA, or PLGA, the molar ratio between LA (lactide) and CL (ε-caprolactone), between GA (glycolide) and CL, or between LA and GA is preferably on the order of 1:1~2. For example, because the biodegradation rate is too high when the

[Chemical Formula 2]

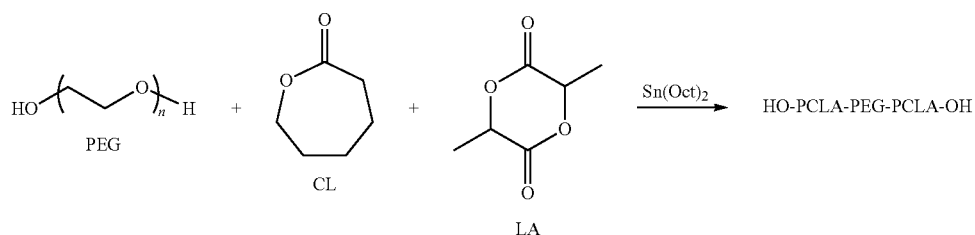

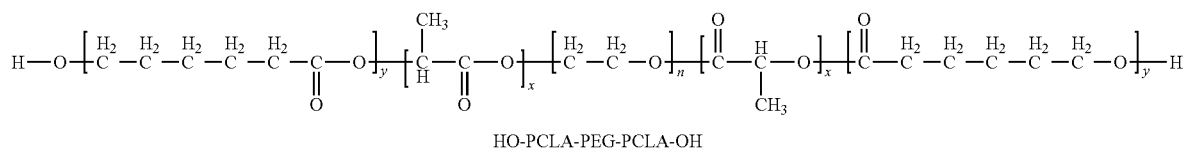

HO-PCLA-PEG-PCLA-OH wherein, n is an integer of 11 to 45, and x and y are independently an integer of 30 to 100.

So long as it comprises a PEG-based compound and a biodegradable hydrophobic polymer selected from among polylactic acid (PLA), polylactic acid-co-polyglycolic acid (PLGA), poly ε-caprolactone (PCL), and poly ε-caprolactone-co-polylactic acid (PCLA), the copolymer (A) prepared by reacting the hydrophilic PEG-based compound with the starting materials of the biodegradable hydrophobic polymer in the presence of a tin catalyst is not particularly limited. However, preferred is the copolymer (A) having at least one substituent that is reactable with the poly(β-aminoester urethane) block which is selected from the group consisting of a primary amine group, a secondary amine group, and a double bond.

Non-limiting examples of the copolymer (A) include polylactic acid (PLA), polyglycolic acid (PGA), poly ε-caprolactone (PCL), a poly(ε-caprolactone-lactic acid) random copolymer (PCLA), a poly(ε-caprolactone-glycolic acid) random copolymer (PCGA), and a poly(lactic acid-glycolic acid) random copolymer (PLGA).

No particular limitations are imparted to the molar ratio of the hydrophilic PEG-based compound to the biodegradable, hydrophobic polymer such as polylactic acid (PLA), polylactic acid-co-polyglycolic acid (PLGA), poly ε-caprolactone (PCL), or poly ε-caprolactone-co-polylactic acid (PCLA) in the copolymer (A). In consideration of various factors including balance between hydrophilic and hydrophobic blocks, a sol-gel transition range, and the strength of the gel formed, the molar ratio is less than 1:1 or too low when the molar ratio exceeds 1:2, the block copolymer may be limitedly used as a drug carrier.

Any compound that exhibits various degrees of ionization depending on pH may be used as the other component of the temperature- and pH-sensitive copolymer according to the present invention, without limitations, and falls within the scope of the present invention. Particularly, poly(β-aminoester urethane) and sulfonamide-based oligomers (B), which are pH-sensitive with simultaneous hydrophilicity and hydrophobicity retained therein depending on the degree of ionization, are preferred. That is, in the block copolymer, the copolymer comprising hydrophilic polyethylene glycol (PEG)-based compound and hydrophobic, biodegradable polymer has an amine group which is capable of reacting with oligomer consisting of poly(β-aminoester urethane)-g-sulfonamide.

The poly(β-aminoester urethane)-based oligomer varies in water solubility depending on pH because the intramolecular tertiary amine is ionized at a pH of 6.8 or less, and thus exhibits pH sensitivity, with pH-dependent transition between hydrogel and sol within the body, as described above.

Also, the sulfonamide-based oligomer varies in water solubility depending on pH because the intramolecular sulfone group is ionized at a pH of 8.0 or higher, and thus exhibits pH sensitivity, with pH-dependent transition between hydrogel and sol within the body, as described above.

The poly(β-aminoester urethane)-g-sulfonamide-based oligomer comprises the poly(β-aminoester urethane) as a backbone with the sulfonamide-based oligomer grafted thereto. It can be prepared using a typical method known in the art. For example, an acrylated sulfamethazine oligomer (SM-A) having a terminal double bond that is produced by the Michael reaction of a sulfonamide derivative oligomer having a terminal carboxyl group with acryloyl chloride is grafted with a compound having hydroxyl groups at opposite ends and a secondary amine, such as diethanolamine, and an isocyanate compound to afford a poly(β-aminoester urethane)-g-sulfonamide derivative oligomer.

Examples of the sulfonamide derivative oligomer useful in the present invention include oligomers of the sulfonamide selected from among sulfamethisole, sulfamethazine, sulfasetamide, sulfaisomidine, sulfafenasole, sulfamethoxasole, sulfadiazine, sulfamethoxydiazine, sulfamethoxypyridazine, sulfadoxine, sulfapyridine, sulfabenzamide, sulfisoxazole, and sulfonamide derivatives thereof.

The compound having hydroxyl groups is a polyethylene glycol (PEG)-based compound, a hydrophilic polymer. The biodegradable polymer is selected from the group consisting of polylactic acid (PLA), polyglycolic acid (PGA), poly ε-caprolactone (PCL), a poly(ε-caprolactone-lactic acid) random copolymer (poly(ε-caprolactone-r-lactic acid), PCLA), a poly(ε-caprolactone-glycolic acid) random copolymer (poly (ε-caprolactone-r-glycolic acid), PCGA), and a poly(lactic acid-glycolic acid) random copolymer (poly(lactic acid-r-glycolic acid), PLGA). The amine compound contains a primary or secondary amine. In addition, the secondary amine compound may be selected from the group consisting of diethanolamine, dipropanolamine, dibutanolamine, dipentanolamine, diheptanolamine, and dioctanolamine. The isocyanate compound has isocyanate groups at opposite ends. Examples of the isocyanate compound useful in the present invention include tetramethylene diisocyanate (TDI) and hexamethylene diisocyanate (HDI), but are not limited to.

The acrylated compound may be represented by the following Chemical Formula 3. Non-limiting examples thereof include all of the afore-mentioned sulfonamides and sulfonamide derivatives. The compound of Chemical Formula 3 is an acrylated sulfamethazine oligomer (SM-A) with a double bond at one end.

[Chemical Formula 3]

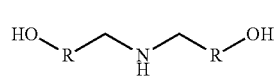

The amine compound used to prepare the pH-sensitive poly(β-aminoester urethane) may be employed without limitations if it has an amine group. Preferred is the amine compound represented by the following Chemical Formula 4:

[Chemical Formula 4]

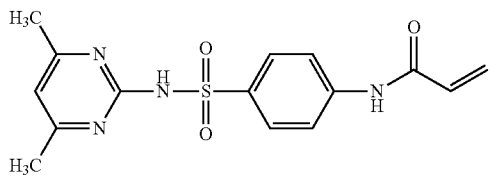

wherein R is an alkyl group containing 1 to 10 carbon atoms.

Examples of the secondary amine compound include, but are not limited to, dipropanolamine, dibutanolamine, dipentanolamine, diheptanolamine, and dioctanolamine.

When the pH-sensitive poly(β-aminoester urethane)-g-sulfonamide derivative oligomer (PUSM) is prepared by reacting diethanolamine with an oligomer of the sulfamethazine derivative dihydroxyl sulfamethazine monomer (DHSM), the molar ratio of the acrylated sulfonamide derivative oligomer to the amine compound of poly(β-aminoester urethane) preferably ranges from 1:0.5 to 1:2.0. The molar ratio of the acrylated sulfonamide derivative oligomer to the amine compound of poly(β-aminoester urethane) is less than 1:0.5 or greater than 1:2.0, the resulting block polymers have a wide distribution of molecular weights and become poor in pH sensitivity, with difficulty in controlling the length of the blocks.

Preferably, the poly(β-aminoester urethane)-g-sulfonamide derivative oligomer has a molecular weight of from 4,000 to 10,000 g/mol. When the molecular weight is below 4,000, it is difficult for the block copolymer to exhibit a sol-gel transition behavior depending on pH. On the other hand, a molecular weight exceeding 10,000 makes it difficult for the block copolymer to be sensitive to temperature.

The block copolymer prepared from the above-mentioned components, that is, by reacting a copolymer (A) of a PEG-based compound and a biodegradable polymer with a poly(β-aminoester urethane)-g-sulfonamide derivative oligomer (B), may have three or more blocks, and preferably may be in a penta to multi-block form. Particularly, it may be represented by the following Chemical Formula 5:

[Chemical Formula 5]

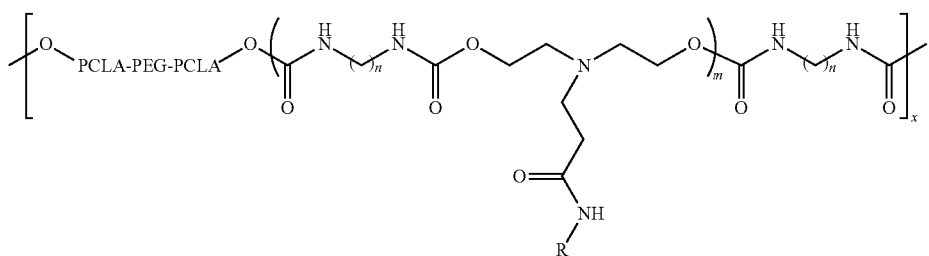

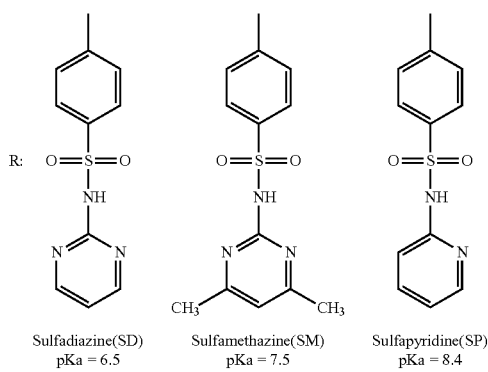

Sulfadiazine(SD)   Sulfamethazine(SM)   Sulfapyridine(SP)
pKa = 6.5          pKa = 7.5             pKa = 8.4 wherein x is an integer of 1 to 200, m is an integer of 1 to 50, and n is an integer of 4 to 6.

Having the amphotericity and pH sensitivity attributable to the hydrophilic and hydrophobic blocks, as described above, the copolymer represented by Chemical Formula 5 may form a hydrogel or may be in a sol state depending on pH.

Particularly, it can perform a role necessary for the sensitivity with pH changes within the body, that is, it can play a satisfactory role in a sustained drug delivery system.

Because the block copolymer (PCLA-PEG-PCLA) of PEG and the biodegradable polyester polymer (PCLA) has hydroxyl groups (—OH) at opposite ends, it can react with an isocyanate group (—NCO). The resulting block copolymer is grafted with an acrylated sulfonamide derivative oligomer at the secondary amine of the poly(β-aminoester urethane) block to finally produce a copolymer having the structure of (PCLA-PEG-PCLA-PUSM)x.

The molecular weight of the block copolymer is not particularly limited, but preferably ranges from 5,000 to 20,000 g/mol. For example, when the molecular weight is outside the upper and lower limits, the hydrophilicity/hydrophobicity balance is broken, disturbing the gelation of the block copolymer.

In addition to the afore-mentioned components, the temperature- and pH-sensitive block copolymer may comprise other components or additives typically used.

To prepare the temperature- and pH-sensitive block copolymer by reacting the copolymer (A) of a PEG-based compound and a biodegradable polymer with the poly(β-aminoester urethane) and sulfonamide derivative oligomers, one of the polymerization methods known in the art, such as Michael reaction, radical polymerization, cationic polymerization, and polycondensation, may be used.

In a preferred embodiment of the present invention, the temperature- and pH-sensitive block copolymer of the present invention may be prepared using a method comprising a) polymerizing a PEG-based compound with a biodegradable PCLA polymer to form a copolymer (A); b) introducing poly(β-aminoester urethane) into the copolymer (A) of PEG and PCLA; and c) grafting a sulfamethazine derivative oligomer to the block copolymer of the copolymer (A) and poly(β-aminoester urethane).

To begin with, a PEG-based compound is reacted with CL and LA, which are respective starting materials of the biodegradable polyester polymers PCL and PLA, to form the triblock polymer PCLA-PEG-PCLA. This reaction may be illustrated in the following Reaction Scheme 1.

[Reaction Scheme 1]

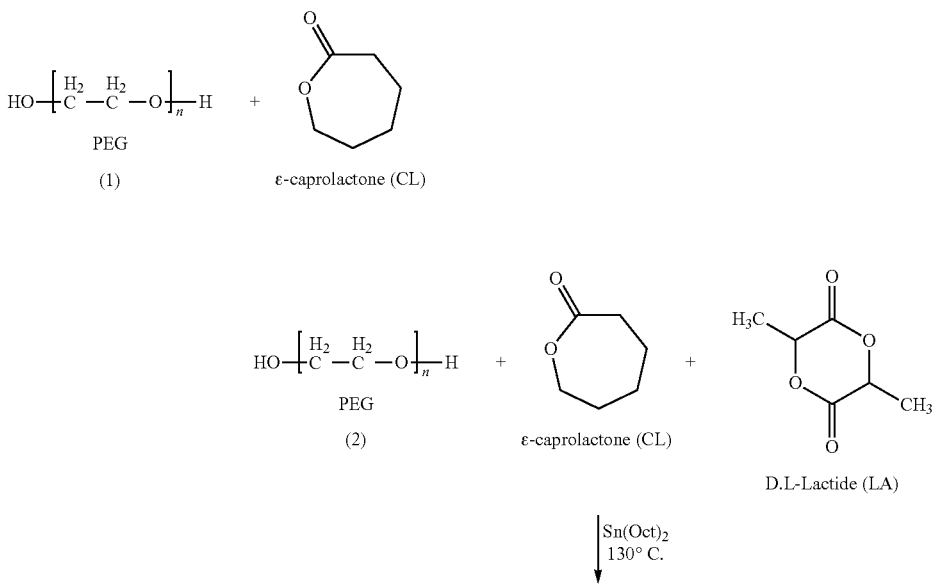

-continued

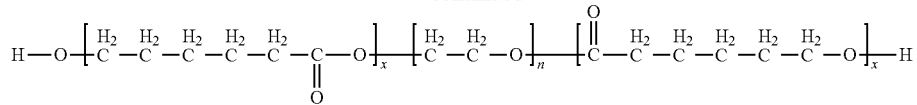

PCL-PEG-PCL (1)

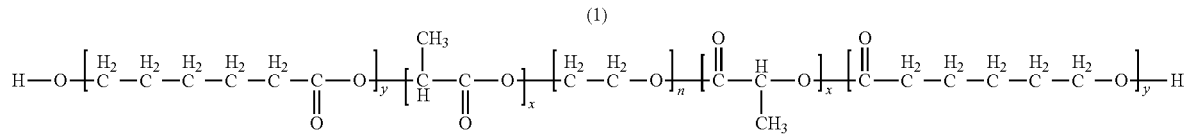

PCLA-PEG-PCLA (2)

The reaction of the PEG-based compound with CL and LA, starting materials of the biodegradable polyester polymers PCL and PLA, is preferably achieved by ring-opening polymerization. The temperature and time of the polymerization may be set forth within a typical range known in the art. Preferably, the ring-opening polymerization is carried out at 130~150° C. for 12~48 hrs. In addition, this reaction may be performed in the presence of a catalyst.

Stannous octoate, stannous chloride, a metal oxide ($GeO_2$, $Sb_3O_2$, $SnO_2$, etc.), aluminum triisopropoxide, $CaH_2$, Zn, lithium chloride, or tris(2,6-di-tert-butylphenolate) may be available as a catalyst for the ring-opening polymerization. To express various degrees of hydrophobicity, molecular weights and kinds of the biodegradable polymer may be suitably controlled.

The introduction of an acrylate group into the sulfamethazine derivative oligomer may be preferably accomplished by reacting the halogen group of acryloyl chloride with the primary terminal amine group of sulfamethazine, as illustrated in the following Reaction Scheme 2.

[Reaction Scheme 2]

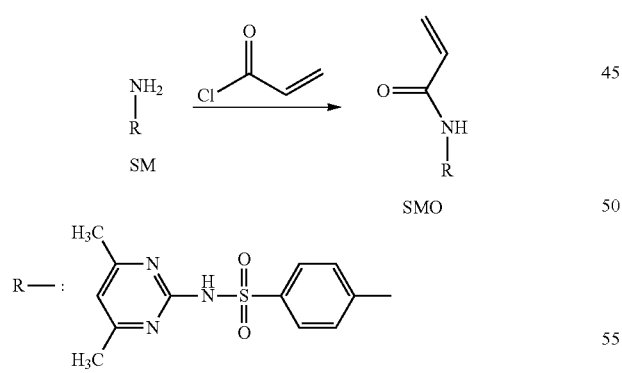

A dihydroxylsulfamethazine oligomer (DHSM), prepared by reacting a sulfamethazine oligomer) with hexamethylene diisocyanate (HDI) and diethanolamine, is subjected, together with the temperature-sensitive triblock copolymer PCLA-PEG-PCLA, to a urethane reaction to introduce a cationic and anionic pH-sensitive group into the block copolymer, as illustrated in the following Reaction Scheme 3.

[Reaction Scheme 3]

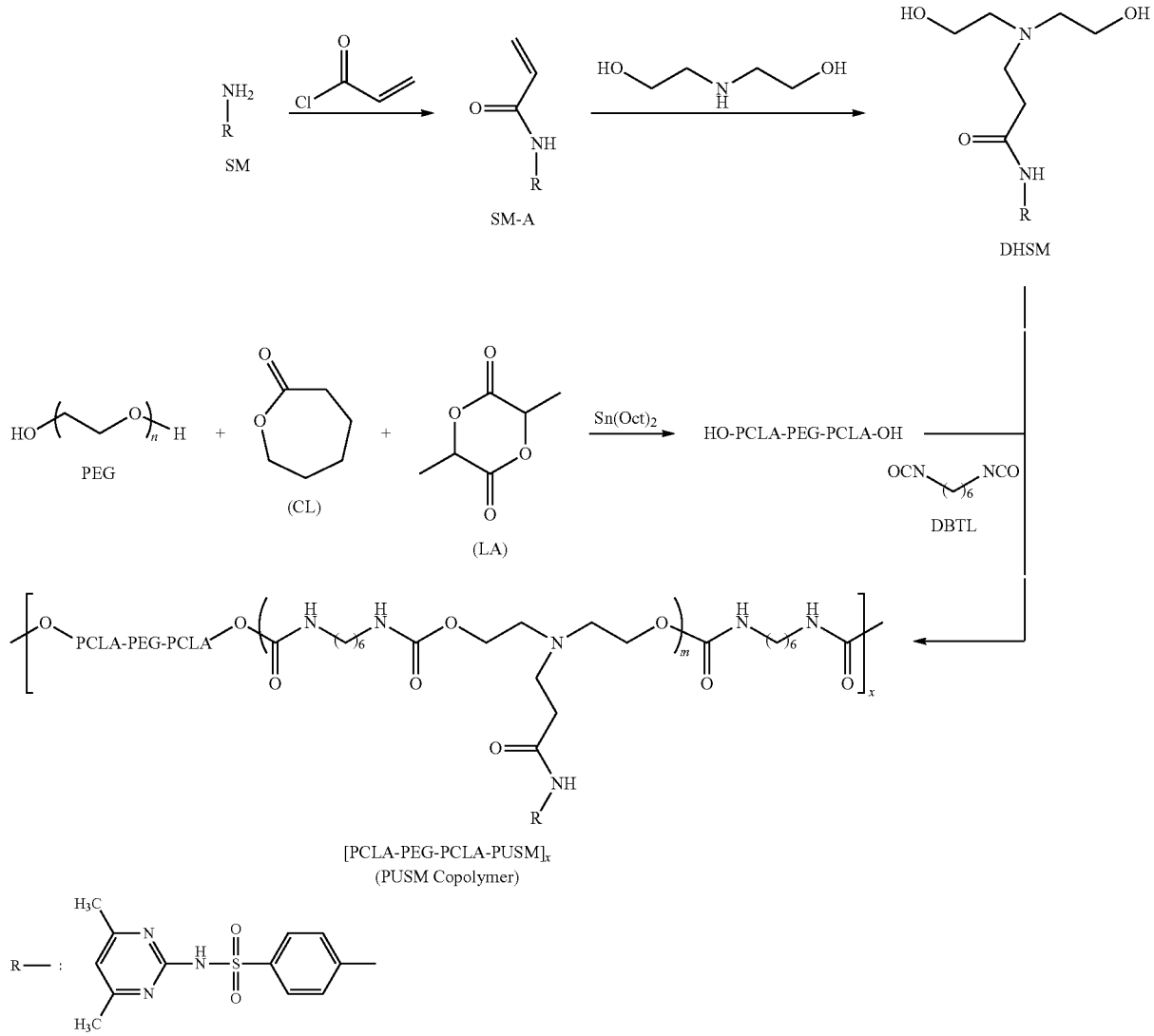

This urethane reaction is not particularly limited with regard to reaction temperature and time, and may be carried out in a typical method known in the art.

The amine compound used in the preparation of the poly (β-aminoester urethane), and the PCLA-PEG-PCLA copolymer grafted with the sulfamethazine oligomer and poly(β-aminoester urethane), are as defined above.

Composed of the hydrophilic PEG block, the hydrophobic PCLA block, and the poly(β-aminoester urethane) and sulfamethazine oligomer, which varies in the degree of ionization depending on pH, the multi-block copolymer is sensitive to both temperature and pH.

The block copolymers, i.e., PCLA-PEG-PCLA and (PCLA-PEG-PCLA-PUSM)$_x$, can be confirmed using various methods known in the art. In practice, the introduction of functional groups and the reaction of terminal groups can be detected by FT-IR and $^1$H-NMR. GPC (gel permeation chromatography) can be applied to identify the structure of the multi-block copolymer in which a copolymer of PEG and PCLA is grafted with poly(β-aminoester urethane) and sulfamethazine oligomers by reading an increase in molecular weight.

To examine the pH sensitivity thereof, the block copolymer was assayed for sol-gel-sol dual transition at various pH values. The data obtained demonstrate that the multi-block copolymer of the present invention is pH-sensitive.

In accordance with a further aspect thereof, the present invention addresses a polymeric hydrogel-type composition for sustained drug delivery, comprising (a) a temperature- and pH-sensitive block copolymer; and (b) an anionic and/or cationic physiologically active agent capable of being loaded into the copolymer.

The physiologically active agent loadable into the polymeric hydrogel-type block copolymer may be a positively charged protein or agent such as EGF and VEGF, or a negatively charged protein or agent such as insulin, hGH, GCS-F, and EPO. So long as it is electrically charged, any drug can be used without limitations. Non-limiting examples of the drug loadable into the hydrogel-type block copolymer include an anticancer agent, an antibacterial agent, a steroid, an anti-inflammatory analgesic, a sex hormone, an immunosuppressant, an anti-viral agent, an anesthetic, an antiemetic, and an anti-histamine agent. In addition to the ingredients, the composition of the present invention may comprise a typical additive known in the art, such as an excipient, a stabilizer, a pH adjuster, an antioxidant, a preservative, a binder, or a disintegrant. A solvent or other additives may be further employed in the composition.

In addition, the polymeric hydrogel-type composition may be formulated into an oral or parenteral dosage form, for example, an intravenous, intramuscular, or subcutaneous injection.

In accordance with still another aspect thereof, the present invention addresses a carrier for sustained drug delivery or disease diagnosis, comprising the temperature- and pH-sensitive block copolymer. The carrier may further comprise an agent loadable into the block copolymer. No limitations are imparted to the agent that is used for the therapy, prophylaxis, or diagnosis of a disease.

In accordance with a still further aspect thereof, the present invention addresses the use of a copolymer as a carrier for drug delivery or disease diagnosis, said copolymer comprising (a) at least one hydrophilic block; (b) at least one biodegradable block varying in hydrophobicity depending on temperature; and (c) at least one unit varying in degree of ionization depending on pH. Preferably, each block or unit in the copolymer ranges in number from 1 to 10.

The unit (c) that varies in degree of ionization depending on pH may be an oligomer (B) selected from the group consisting of, but not limited to, poly(β-aminoester urethane), a sulfamethazine oligomer, and a combination thereof. The hydrophilic block (a) and the biodegradable block (b) varying in hydrophobicity depending on temperature are each as defined above. Other hydrophilic and/or hydrophobic materials can also be used.

Also, the present invention provides a polymeric hydrogel-type pharmaceutical composition comprising the block copolymer; and a physiologically active agent loadable into the block copolymer. Further, the present invention provides the use of a copolymer as a carrier for drug delivery or disease diagnosis, said copolymer comprising (a) at least one hydrophilic block; (b) at least one biodegradable block varying in hydrophobicity depending on temperature; and (c) at least one unit varying in degree of ionization depending on pH.

For administration, the composition of the present invention may comprise at least one pharmaceutically acceptable vehicle, in addition to the active ingredients. For example, saline, sterile water, Ringer's solution, buffered saline, cyclodextrin, a dextrose solution, a maltodextrin solution, glycerol, ethanol, liposome, or a combination thereof may be used. If necessary, the pharmaceutical composition may further comprise a typical additive such as an antioxidant, a buffer, a bacteristat, etc. Furthermore, the pharmaceutical composition may be formulated into injections such as aqueous solutions, suspensions, emulsions, etc., pills, capsules, granules or tablets, with the aid of a diluent, a dispersant, a surfactant, a binder and/or a lubricant. Moreover, the pharmaceutical composition may be formulated into suitable dosage forms according to a method that is well known in the art or the method disclosed in Remington's Pharmaceutical Science, Mack Publishing Company, Easton Pa.

The pharmaceutical composition of the present invention may comprise a pharmaceutically acceptable vehicle. Examples of the pharmaceutically acceptable vehicle may include, but are not limited to, physiological saline, polyethylene glycol, ethanol, vegetable oil, and isopropylmyristate.

In accordance with another aspect thereof, the present invention addresses a method for treating a disease, comprising administering a pharmaceutical composition in a pharmaceutically effective amount to a subject. In this regard, the term "subject" means an animal in need of the treatment of a disease of interest, and is intended to encompass humans, non-human primates, and mammals such as mice, rats, dogs, cats, horses, cows, etc. It is apparent to those skilled in the art that the pharmaceutically effective amount may vary depending on various factors including a patient's weight, age, gender and health condition, the time of administration, the route of administration, excretion rate, and the severity of disease.

A suitable dose of the pharmaceutical composition of the present invention may depend on kind of the loaded compounds, disease severity, and the condition of a subject in need of treatment, and can be determined by those skilled in the art. Generally, it ranges from 0.001 to 100 mg/kg/day, and preferably from 0.01 to 30 mg/kg/day. The total effective amount of the pharmaceutical composition of the present invention can be administered to patients in a single dose or can be administered by a fractionated treatment protocol, in which multiple doses are administered over a more prolonged period of time. The *Archidendron clypearia* methanol extract (Ac-ME) of the present invention may be present in an amount of from 0.0001 to 10 wt % based on the total weight of the pharmaceutical composition, and preferably in an amount of from 0.001 to 1 wt %.

The pharmaceutical composition may be administered to mammals such as rats, mice, cows, humans, etc., via various routes. No limitations are imparted to the administration route of the pharmaceutical composition of the present invention. For example, the pharmaceutical composition may be administered orally or rectally, or injected intravenously, intramuscularly, subcutaneously, intrauterinally, or intercerebroventrically.

A better understanding of the present invention may be obtained through the following examples which are set forth to illustrate, but are not to be construed as limiting, the present invention.

EXAMPLE 1

Preparation of Poly(β-aminoester urethane)-g-sulfonamide Oligomer Sensitive to pH A sulfonamide oligomer was prepared. To this end, sulfamethazine was dissolved in an acetone/water co-solvent containing sodium hydroxide, and acryloyl chloride was dropwise added to the solution to give a sulfamethazine monomer having a terminal double bond. Added to 1 mole of the acrylated sulfamethazine monomer was 1 mole of diethanolamine (DEA), a starting material of poly(β-aminoester urethane), and then dimethylformamide (DMF), until its concentration reached 10%, followed by a Michael reaction at 50° C. for 12 hrs.

After completion of the reaction, the product was precipitated in n-hexane to remove unreacted materials, and the product was dried under vacuum to afford a poly(β-aminoester urethane)-g-sulfonamide oligomer (DHSM). The yield was 70% or higher.

EXAMPLE 2

Preparation of Triblock Copolymer Poly(ε-caprolactone-co-lactic acid)-Polyethylene glycol-Poly(ε-caprolactone-co-lactic acid) (PCLA-PEG-PCLA) Sensitive to Temperature In a reactor, 10 g of polyethylene glycol (PEG, Mn=1,500, 1,650, 2,000, 5,000) and 0.2 g of the catalyst stannous octoate were dehydrated at 110° C. for 4 hrs under a vacuum condition. The sufficiently dried reactants were cooled, and mixed with 6.0 g (5.576 ml) of ε-caprolactone and lactide, which are monomers of the biodegradable polyester polymer, in a nitrogen atmosphere. Following a slow temperature elevation to 135° C., ring-opening polymerization was carried out for 24 hrs (refer to Reaction Scheme 1). Instead of stannous octoate, a metal oxide such as $GeO_2$, $Sb_3O_2$, $SnO_2$, aluminum triisopropoxide, $CaH_2$, Zn, lithium chloride, or tris(2,6-di-tert-butylphenolate) may be used as a catalyst for the ring-opening polymerization. Controlled amounts of PEG, ε-caprolactone, and lactide were employed to give a desired molecular weight and a hydrophilic-hydrophobic balance to the triblock copolymer PCLA-PEG-PCLA.

Stannous octoate was used in an amount of 0.5 weight % based on the weight of PEG added. After completion of the reaction, the reaction mixture was cooled to room temperature and dissolved in a small amount of methylene chloride. To remove unreacted materials, the reaction mixture was added to an excess of ethyl ether to afford the product as a precipitate. This precipitate was dried at 40° C. for 48 hrs under vacuum. The product was a block copolymer (PCLA-PEG-PCLA) polymerized from polyethylene glycol and a biodegradable polyester polymer composed of ε-caprolactone and lactide. The yield was 91% or higher. Triblock copolymers (PCLA-PEG-PCLA) with various molecular weights were synthesized using various molar ratios and molecular weights of ε-caprolactone, lactide, and polyethylene glycol.

EXAMPLE 3

Synthesis of Temperature- and pH-Sensitive Block Copolymer 3-1. Preparation of the Multi-Block Copolymer Poly(ε-caprolactone-co-lactic acid)-Polyethylene glycol-Poly(ε-caprolactone-co-lactic acid)-Poly(β-aminoester urethane)-g-sulfonamide oligomer (PCLA-PEG-PCLA-PUSM)x)

In a reactor, 1 mmol of the triblock copolymer PCLA-PEG-PCLA (Mn=5,900 g/mol) prepared in Example 2 was placed, together with 5 mmol of the pH-sensitive oligomer DHSM prepared in Example 1 and 6 mmol of HDI were dissolved in 100 mL of DMF, then 0.002 g of DTBL was added, and reacted at 80° C. for 2 hrs at a reduced pressure.

Unreacted materials were removed by precipitating the product in ethyl ether. After filtration, the product (PCLA-PEG-PCLA-PUSM)x was dried for 48 hrs in a vacuum. The yield was 90% or higher.

Triblock copolymers (PCLA-PEG-PCLA) and multi-block copolymers (poly(ε-caprolactone-co-lactic acid)-polyethylene glycol-poly(ε-caprolactone-co-lactic acid)-poly(β-aminoester urethane)-g-sulfonamide oligomer) with various molecular weights were synthesized in the same manner as mentioned above, but using various conditions such as for molecular weights of PEG, the biodegradable polymer (PCLA), poly(β-aminoester urethane), and sulfonamide, and molar ratios between PEG and PCLA, as summarized in Table 1 below.

In Table 1, PDI (polydispersity index), determined by GPC, indicates the distribution of molecular weights of the synthesized block copolymers. A lower PDI value refer to a narrower distribution of molecular weights of the copolymers, while higher PDI values mean that the molecular weights of the copolymers are less homogenous.

The multi-block copolymer synthesized under the C8-1 condition of Table 1 was examined for sol-gel transition. Representative sol-gel transition diagrams at various concentrations are given in FIG. 2. The synthesis of the multi-block copolymer under C8-1 condition of Table 1 was confirmed using H-NMR. Representative H-NMR spectra are shown in FIG. 4. The gel into which the multi-block copolymer synthesized in the C8-1 condition of Table 1 was formed by sol-gel transition was measured for strength using a rheometer. Viscosity of the 25 wt % block copolymer was monitored with temperature in 5 pH conditions, and the results are plotted in FIG. 5. An examination was also made to see whether the multi-block copolymer synthesized in the C8-1 condition of Table 1 forms a gel in the human body condition, that is, at pH 7.4 and 37° C. In this regard, the 25 wt % block copolymer was injected into the back of five mice and monitored for gelation with time. The results of in vivo gel formation are shown FIG. 6. The multi-block polymer synthesized in the C8-1 condition of Table 1 was examined for in vivo compatibility. According to the extraction method (L929), cells were exposed to the copolymer for 2 days and assayed for viability. The results are given in FIG. 7. As shown in FIG. 8, zeta potential of the CE-1 copolymer solutions decreased with increasing pH. It was +19.5 mV at pH 6.5, +2.7 mV at pH 7.5, and +1.0 mV at pH 8.0. In contrast, zeta potential of the CE-2 copolymer solutions increased when lowering pH. Interestingly, as a combination, zeta potential of the C8-1 copolymer solutions was positive at acidic pH (+4.6 mV at pH 6.0), and became negative at basic pH (−11.4 mV at pH 8.0). This is a result of ionization of the tertiary amine at relatively acidic pH and sulfonamide groups at relatively basic pH, and their deionization at neutral pH. The possibility of releasing anionic protein from the C8-1 was examined using hGH (human growth hormone) as a model protein. An in vivo release profile of hGH from the C8-1 in SD rats is presented in FIG. 9. The hGH concentration in the serum of the SD rats with hGH-loaded hydrogels was maintained at higher regarded effective concentration (≥1 ng $mL^{-1}$) for more than 3 days with a minimal initial burst. Meanwhile, the hGH solution group (as a negative control group) showed a significantly initial burst release profile. The controlled release of hGH from the complex hydrogel was governed by ionic complexation between the anionic hGH and cationic moieties in the C8-1 copolymer.

TABLE 1

| | PCLA-PEG-PCLA (Mn[c]) | PEG/PCLA (wt ratio) | PEG (Mn[a]) | Sulfonamide-g-PAEU[b] | PDI[c] |
|---|---|---|---|---|---|
| C1 | 1850-1500-1850 | 1/2.47 | 1500 | 3000 | 1.85 |
| C2 | 1950-1500-1950 | 1/2.60 | 1500 | 5000 | 1.87 |
| C3 | 2100-1500-2100 | 1/2.80 | 1500 | 7000 | 1.90 |
| C4 | 1850-1750-1850 | 1/2.11 | 1750 | 3000 | 1.90 |
| C5 | 1950-1750-1950 | 1/2.23 | 1750 | 5000 | 1.90 |
| C6 | 2100-1750-2100 | 1/2.40 | 1750 | 7000 | 1.95 |
| C7-1 | 1850-2000-1850 | 1/1.85 | 2000 | 3000 | 1.96 |
| C7-2 | 1850-2000-1850 | 1/1.85 | 2000 | 5000 | 1.96 |
| C7-3 | 1850-2000-1850 | 1/1.85 | 2000 | 7000 | 1.97 |
| C8-1 | 1950-2000-1950 | 1/1.93 | 2000 | 6500[d] | 1.97 |
| C8-2 | 1950-2000-1950 | 1/1.93 | 2000 | 6450[e] | 1.98 |
| C8-3 | 1950-2000-1950 | 1/1.93 | 2000 | 6400[f] | 1.98 |
| C9-1 | 2100-2000-2100 | 1/2.10 | 2000 | 3000 | 1.98 |
| C9-2 | 2100-2000-2100 | 1/2.10 | 2000 | 5000 | 1.99 |
| C9-3 | 2100-2000-2100 | 1/2.10 | 2000 | 7000 | 1.99 |

[a]Determined by supplier,
[b]H-NMR,
[c]GPC
[d]Sulfonamide; sulfadiazine,
[e]sulfonamide; sulfamethazine,
[f]sulfonamide; sulfapyridine

3-2. Preparation of Multi-Block Copolymer (1)

A multi-block copolymer poly(ε-caprolactone-co-lactic acid)-polyethylene glycol-poly(ε-caprolactone-co-lactic acid)-poly(β-aminoester urethane)-g-sulfonamide with a number average molecular weight of 10,500 g/mol was prepared in the same manner as in Example 3, with the exception that dipropanolamine, instead of diethanolamine, was used.

3-3. Preparation of Multi-Block Copolymer (2)

A multi-block copolymer poly(ε-caprolactone-co-lactic acid)-polyethylene glycol-poly(ε-caprolactone-co-lactic acid)-poly(β-aminoester urethane)-g-sulfonamide with a number average molecular weight of 10,700 g/mol was prepared in the same manner as in Example 3, with the exception that dibutanolamine, instead of diethanolamine, was used.

3-4. Preparation of Multi-Block Copolymer (3)

A multi-block copolymer poly(ε-caprolactone-co-lactic acid)-polyethylene glycol-poly(ε-caprolactone-co-lactic acid)-poly(β-aminoester urethane)-g-sulfonamide with a number average molecular weight of 11,000 g/mol was prepared in the same manner as in Example 3, with the exception that dipentanolamine, instead of diethanolamine, was used.

3-5. Preparation of Multi-Block Copolymer (4)

A multi-block copolymer poly(ε-caprolactone-co-lactic acid)-polyethylene glycol-poly(ε-caprolactone-co-lactic acid)-poly(β-aminoester urethane)-g-sulfonamide with a number average molecular weight of 11,200 g/mol was prepared in the same manner as in Example 3, with the exception that diheptanolamine, instead of diethanolamine, was used.

3-6. Preparation of Multi-Block Copolymer (5)

A multi-block copolymer poly(ε-caprolactone-co-lactic acid)-polyethylene glycol-poly(ε-caprolactone-co-lactic acid)-poly(β-aminoester urethane)-g-sulfonamide with a number average molecular weight of 11,500 g/mol was prepared in the same manner as in Example 3, with the exception that dioctanolamine, instead of diethanolamine, was used.

3-7. Preparation of Multi-Block Copolymer (6)(C8-2)

A multi-block copolymer of poly(ε-caprolactone-co-lactic acid)-polyethylene glycol-poly(ε-caprolactone-co-lactic acid)-poly(β-aminoester urethane)-g-sulfonamide with a number average molecular weight of 6,450 g/mol was prepared in the same manner as in Example 1, with the exception that sulfadiazine ($pK_a$=6.5), instead of sulfamethazine ($pK_a$=7.5) was used.

3-8. Preparation of Multi-Block Copolymer (7) (C8-3)

A multi-block copolymer of poly(ε-caprolactone-co-lactic acid)-polyethylene glycol-poly(ε-caprolactone-co-lactic acid)-poly(β-aminoester urethane)-g-sulfonamide with a number average molecular weight of 6,400 g/mol was prepared in the same manner as in Example 1, with the exception that sulfapyridine ($pk_a$=8.4), instead of sulfamethazine ($pK_a$=7.5), was used.

COMPARATIVE EXAMPLE 1 (CE-1)

A multi-block copolymer poly(ε-caprolactone-co-lactic acid)-polyethylene glycol-poly(ε-caprolactone-co-lactic acid)-poly(β-aminoester urethane) with a molecular weight of 95,000 g/mol was prepared in the same manner as in Example 3, with the exception that poly(β-aminoester urethane), instead of poly(β-aminoester urethane)-g-sulfonamide, was used.

COMPARATIVE EXAMPLE 2 (CE-2)

A multi-block copolymer poly(ε-caprolactone-co-lactic acid)-polyethylene glycol-poly(ε-caprolactone-co-lactic acid)-sulfonamide with a molecular weight of 11,500 g/mol was prepared in the same manner as in Example 3, with the exception that a sulfonamide oligomer, instead of poly(β-aminoester urethane)-g-sulfonamide, was used.

EXPERIMENTAL EXAMPLE 1

Evaluation of Sol-Gel Transition Behavior According to pH Change (1)

The block copolymers prepared according to the present invention were assayed for sol-gel transition behavior with temperature and pH.

In detail, the multi-block copolymer prepared in Example 3 was dissolved in an amount of 20 wt %, 25 wt %, and 30 wt % in a buffer (PBS), and its pH was adjusted to 5.5, 6.0, 6.5, 7.0, and 7.5 at 50° C. with an NaOH solution. The block copolymer solutions with respective pH values were heated at an elevation rate of 2° C., and remained in a thermal equilibrium state at specific temperatures for 10 min during which the solutions were slanted to measure their sol-gel transition behaviors. Changes in the sol-gel behavior of the block copolymers with temperature and pH are shown in FIGS. 2 and 5.

The block copolymers of the present invention were found to exhibit reversible sol-gel transition with pH as well as temperature because of their intramolecular poly(β-aminoester urethane)-g-sulfonamide and biodegradable copolymer that vary in degree of ionization with pH and in hydrophobicity with temperature, respectively (FIG. 2)

Particularly, exhibiting a reversible sol-gel transition behavior in the same condition as the human body (37° C., pH 7.4), the block copolymers of the present invention can be industrially applied as a drug delivery system.

EXPERIMENTAL EXAMPLE 2

Evaluation of Sol-Gel Transition Behavior According to pH Change (1)

The block copolymers synthesized under various conditions were assayed for sol-gel transition behavior with temperature and pH.

Multi-block copolymers with various molecular weights were prepared in the same manner as in Example 3, with the exception that the molecular weight of PEG and the molar ratio of PEG to PCLA were changed as shown in Table 2, below.

A sol-gel transition behavior was detected in none of A1 to A4, or B1. This was considered to be due to an imbalance in molecular weight between the intramolecular blocks. That is, A1 to A4 remained in a sol phase even when temperatures and pH were changed because the PEG had too small a molecular weight. As for B1, its PEG block had too large a molecular weight, causing the block polymer to be insoluble in water.

In order to prepare a temperature- and pH-sensitive block copolymer exhibiting a reversible sol-gel transition behavior, consideration must be taken of the temperature and pH dependency of the pH-sensitive block, and the molecular weight of the hydrophilic block PEG, in addition to the molar ratio of PEG/PCLA.

TABLE 2

| Ex. 3 | PEG$_{a)}$ | PCLA-PEG-PCLA$_{b)}$ | SM-g-PAEU$_{c)}$ | PDI$_{c)}$ | Sol-gel phase transition |
|---|---|---|---|---|---|
| A1 | 500 | 4200 | 8200 | 1.35 | X$_{d)}$ |
| A2 |  | 4400 | 8400 | 1.27 | X |
| A3 |  | 4700 | 8700 | 1.30 | X |
| A4 |  | 5000 | 9000 | 1.39 | X |
| B1 | 5000 | 8700 | 12700 | 1.50 | X |

$_{a)}$Determined by supplier,
$_{b)}$¹H-NMR,
$_{c)}$GPC,
$_{d)}$X means no dual gelation Accordingly, hydrogels of the temperature- and pH-sensitive block copolymers in accordance with the present invention cannot be obtained from simple combinations of hydrophilic blocks, hydrophobic blocks, and pH-sensitive blocks, but only after molecular weights and molar ratios of the components and molar ratios of the blocks are optimally controlled. In addition, the present invention can allow for designing sustained drug delivery systems in response to various conditions, and can be applied in practice Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A block copolymer prepared by reacting:
   (a) a copolymer consisting of a hydrophilic polyethylene glycol (PEG)-based compound and a biodegradable, hydrophobic polymer; and
   (b) an oligomer consisting of poly(β-aminoester urethane)-g-sulfonamide.

2. The block copolymer of claim 1, wherein the block copolymer is sensitive to both temperature and pH.

3. The block copolymer of claim 1, wherein the block copolymer exhibits a cationic/anionic dual transition behavior with pH change.

4. The block copolymer of claim 1, wherein the polyethylene glycol-based compound is represented by the following Chemical Formula 1:

[Chemical Formula 1]

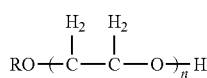

wherein
R is hydrogen or an alkyl group containing 1 to 5 carbon atoms, and
n is an integer of 11 to 45.

5. The block copolymer of claim 1, wherein a number average molecular weight (Mn) of the polyethylene glycol-based compound ranges from 500 to 5,000 g/mol.

6. The block copolymer of claim 1, wherein the biodegradable polymer is selected from the group consisting of polylactic acid (PLA), polyglycolic acid (PGA), poly ε-caprolactone (PCL), a poly(ε-caprolactone-lactic acid) random copolymer (PCLA), a poly(ε-caprolactone-glycolic acid) random copolymer (PCGA), and a poly(lactic acid-glycolic acid) random copolymer (PLGA).

7. The block copolymer of claim 1, wherein a molar ratio of the polyethylene glycol-based compound and the biodegradable polymer ranges from 1:1 to 1:3.

8. The block copolymer of claim 1, wherein the copolymer of hydrophilic polyethylene glycol (PEG)-based compound and biodegradable hydrophobic polymer has at least one functional group that is reactable with an oligomer consisting of poly(β-aminoester urethane)-g-sulfonamide.

9. The block copolymer of claim 1, wherein the oligomer consisting of poly(β-aminoester urethane)-g-sulfonamide has a tertiary amine that is ionized at a pH of 6.8 or less.

10. The block copolymer of claim 1, wherein the oligomer consisting of poly(β-arninoester urethane)-g-sulfonamide has a sulfonamide group that is ionized at a pH of 8 or higher.

11. The block copolymer of claim 1, wherein the oligomer consisting of poly(β-arninoester urethane)-g-sulfonamide is prepared by reacting:
   (a) a compound having a hydroxyl group;
   (b) an amine compound;
   (c) an isocyanate compound; and
   (d) a sulfonamide compound.

12. The block copolymer of claim 11, wherein the amine compound is a primary or secondary amine compound.

13. The block copolymer of claim 12, wherein the secondary amine compound is selected from the group consisting of diethanolamine, dipropanolamine, dibutanolarnine, dipentanolamine, diheptanolamine, and dioctanolamine.

14. The block copolymer of claim 11, wherein the isocyanate compound has an isocyanate group at both ends.

15. The block copolymer of claim 14, wherein the isocyanate compound is tetramethylene disiocyante (TDI) or hexamethylene diisocyanate (HDI).

16. The block copolymer of claim 11, wherein a molar ratio of the compound having a hydroxyl group, the amine compound, and the isocyanate compound ranges from 1:0.5:3 to 1:2.0:6.0.

17. The block copolymer of claim 11, wherein the sulfonamide compound is selected from the group consisting of sulfadiazine (pK$_a$=6.5), sulfamethazine (pK$_a$=7.5) and sulfapyridine (pK$_a$=8.4).

18. The block copolymer of claim 1, wherein a molecular weight of the oligomer consisting of poly(β-aminoester urethane)-g-sulfonamide ranges from 4,000 to 10,000 g/mol.

19. The block copolymer of claim 1, wherein the block copolymer is in a penta- or multi-block form.

20. The block copolymer of claim 1, wherein the block copolymer is selected from the group consisting of compounds represented by the following General Formula:

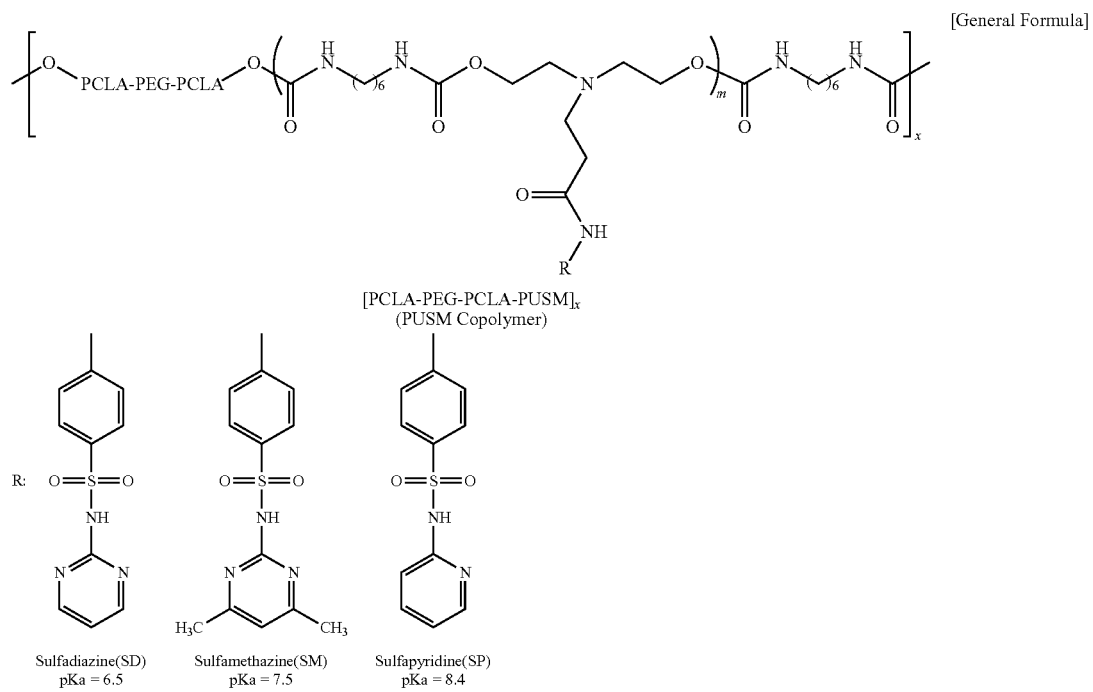

wherein
x is an integer of 1 to 200;
m is an integer of 1 to 50; and
n is an integer of 4 to 6.

21. A carrier for sustained drug delivery or disease diagnosis, comprising the block copolymer of claim 1.

22. A polymeric hydrogel-type pharmaceutical composition, comprising:

(a) a block copolymer of claim 1; and
(b) a physiologically active agent loadable into the block copolymer.

23. A method of using the block copolymer of claim 1 as a carrier for drug delivery or disease diagnosis.

* * * * *